US010064138B2

(12) United States Patent
Badam et al.

(10) Patent No.: US 10,064,138 B2
(45) Date of Patent: Aug. 28, 2018

(54) ENERGY EFFICIENT WIRELESS DATA TRANSFER

(71) Applicant: Microsoft Technology Licensing, LLC, Redmond, WA (US)

(72) Inventors: Anirudh Badam, Redmond, WA (US); Edmund B. Nightingale, Redmond, WA (US); Ranveer Chandra, Bellevue, WA (US); Jian Huang, Atlanta, GA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 255 days.

(21) Appl. No.: 14/580,767

(22) Filed: Dec. 23, 2014

(65) Prior Publication Data

US 2016/0183191 A1 Jun. 23, 2016

(51) Int. Cl.
*H04W 52/02* (2009.01)
*H04W 8/18* (2009.01)

(52) U.S. Cl.
CPC ....... *H04W 52/0251* (2013.01); *H04W 8/183* (2013.01); *H04W 52/0229* (2013.01); *Y02D 70/00* (2018.01); *Y02D 70/1262* (2018.01); *Y02D 70/142* (2018.01); *Y02D 70/144* (2018.01); *Y02D 70/162* (2018.01); *Y02D 70/26* (2018.01)

(58) Field of Classification Search
CPC ........................... H04L 67/1097; H04W 4/008
See application file for complete search history.

(56) References Cited

U.S. PATENT DOCUMENTS

| | | | |
|---|---|---|---|
| 7,149,817 | B2 | 12/2006 | Pettey |
| 7,565,454 | B2 | 7/2009 | Zuberi |
| 8,181,239 | B2 | 5/2012 | Pandya |
| 8,412,798 | B1 | 4/2013 | Wang |
| 8,458,280 | B2 | 6/2013 | Hausauer et al. |

(Continued)

FOREIGN PATENT DOCUMENTS

WO 2014047205 A1 3/2014

OTHER PUBLICATIONS

Grant et al., "RDMA Capable iWARP over Datagrams", In the Proceedings of the 2011 IEEE International Parallel & Distributed Processing Symposium, May 16, 2011, 12 pages.

(Continued)

*Primary Examiner* — David Oveissi
(74) *Attorney, Agent, or Firm* — Newport IP, LLC; Jacob P. Rohwer

(57) ABSTRACT

The techniques and systems described herein implement direct memory access in association with a wireless data transfer. In one example, data units are received at a device and it is determined that the data units have been transferred using low-power consumption data transfer and that the data units are to be directly stored in a predetermined memory (e.g., a dedicated memory) of the device. In another example, a first device provides an instruction to a partner device to store data in specific storage location(s) so that the data can be retrieved from the specific storage location(s) without interrupting a main processor of the partner device. The data may also be directly stored in the predetermined memory of the first device without interrupting a main processor of the first device.

19 Claims, 8 Drawing Sheets

(56) References Cited

U.S. PATENT DOCUMENTS

| | | | | |
|---|---|---|---|---|
| 8,504,795 | B2 | 8/2013 | Shah et al. | |
| 8,676,851 | B1 | 3/2014 | Nesbit et al. | |
| 2004/0210320 | A1 | 10/2004 | Pandya | |
| 2005/0148358 | A1 | 7/2005 | Lin et al. | |
| 2005/0177712 | A1 | 8/2005 | Kadi | |
| 2007/0028138 | A1 | 2/2007 | Noya et al. | |
| 2007/0214374 | A1 | 9/2007 | Hempstead et al. | |
| 2008/0219151 | A1* | 9/2008 | Ma | H04H 60/11 370/221 |
| 2008/0253395 | A1 | 10/2008 | Pandya | |
| 2010/0070652 | A1 | 3/2010 | Maciocco et al. | |
| 2011/0134906 | A1 | 6/2011 | Garudadri et al. | |
| 2012/0079143 | A1 | 3/2012 | Krishnamurthi et al. | |
| 2012/0213118 | A1* | 8/2012 | Lindsay | H04L 12/12 370/254 |
| 2013/0275631 | A1 | 10/2013 | Magro et al. | |
| 2014/0112200 | A1* | 4/2014 | Lor | H04W 8/005 370/255 |
| 2014/0164545 | A1 | 6/2014 | Davis et al. | |
| 2015/0127738 | A1* | 5/2015 | Thompson | H04W 4/005 709/204 |
| 2015/0280936 | A1* | 10/2015 | Bishop | G08C 17/02 700/275 |
| 2016/0106368 | A1* | 4/2016 | Wu | G01P 13/00 702/50 |

OTHER PUBLICATIONS

Thompson, Peter, "Multiple Processors in High-Performance Embedded Computing: "Only Connect" ", retrieved on Sep. 15, 2014 at «http://eecatalog.com/military/2013/06/11/multiple-processors-in-high-performance-embedded-computing-only-connect/», Extension Media, Jun. 11, 2013, 4 pages.

Vaidyanathan et al., "Exploiting RDMA Operations for Providing Efficient Fine-Grained Resource Monitoring in Cluster-based Servers", In the Proceedings of the 2006 IEEE International Conference on Cluster Computing, Sep. 25, 2006, 10 pages.

"International Search Report & Written Opinion Issued in PCT Application No. PCT/US2015/064356", dated Jun. 21, 2016, 19 Pages.

"International Preliminary Report on Patentability Issued in PCT Application No. PCT/US2015/064356", dated Jan. 2, 2017, 12 Pages.

"Search Report Issued in European Patent Application No. 18154787", dated Apr. 24, 2018, 7 pages.

"Search Report Issued in European Patent Application No. 18154788", dated Apr. 24, 2018, 7 pages.

* cited by examiner

ENERGY EFFICIENT WIRELESS DATA TRANSFER

BACKGROUND

Today, wireless devices, such as smartphones, are used to exchange a large amount of data via wireless connections (e.g., a network connection). A wireless device may be configured to operate pre-installed applications that transfer data (e.g., voice communication functionality, messaging functionality, etc.) and/or user-installed applications that transfer data (e.g., an email client, a social network application, etc.).

A wireless device typically uses a main processor in association with the transfer of data to and from the wireless device. However, by using the main processor, existing wireless devices consume large amounts of power in association with the transfer of data.

SUMMARY

The techniques and systems described herein implement direct memory access in association with a wireless data transfer. In one example, data units are wirelessly received at a device and it is determined that the data units have been transferred via low-power consumption data transfer. The data units are then directly stored in a predetermined memory (e.g., a dedicated memory) of the device. At a later time, it is determined that a condition exists to interrupt a main processor of the wireless device to process the data units stored in the predetermined memory.

In another example, a first device provides an instruction to a partner device to store data in specific storage location(s) of a memory of the partner device so that the data can be retrieved from the specific storage location(s) of the memory of the partner device without interrupting a main processor of the partner device. The data may also be directly stored in a dedicated memory of the first device without interrupting a main processor of the first device.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, algorithms, components, modules, and/or element(s) as permitted by the context above and throughout the document.

BRIEF DESCRIPTION OF THE CONTENTS

The detailed description is presented with reference to accompanying figures. In the figures, the left-most digit(s) of a reference number identifies the figure in which the reference number first appears. The use of the same reference numbers in different figures indicates similar or identical items.

DETAILED DESCRIPTION

Figure 1:
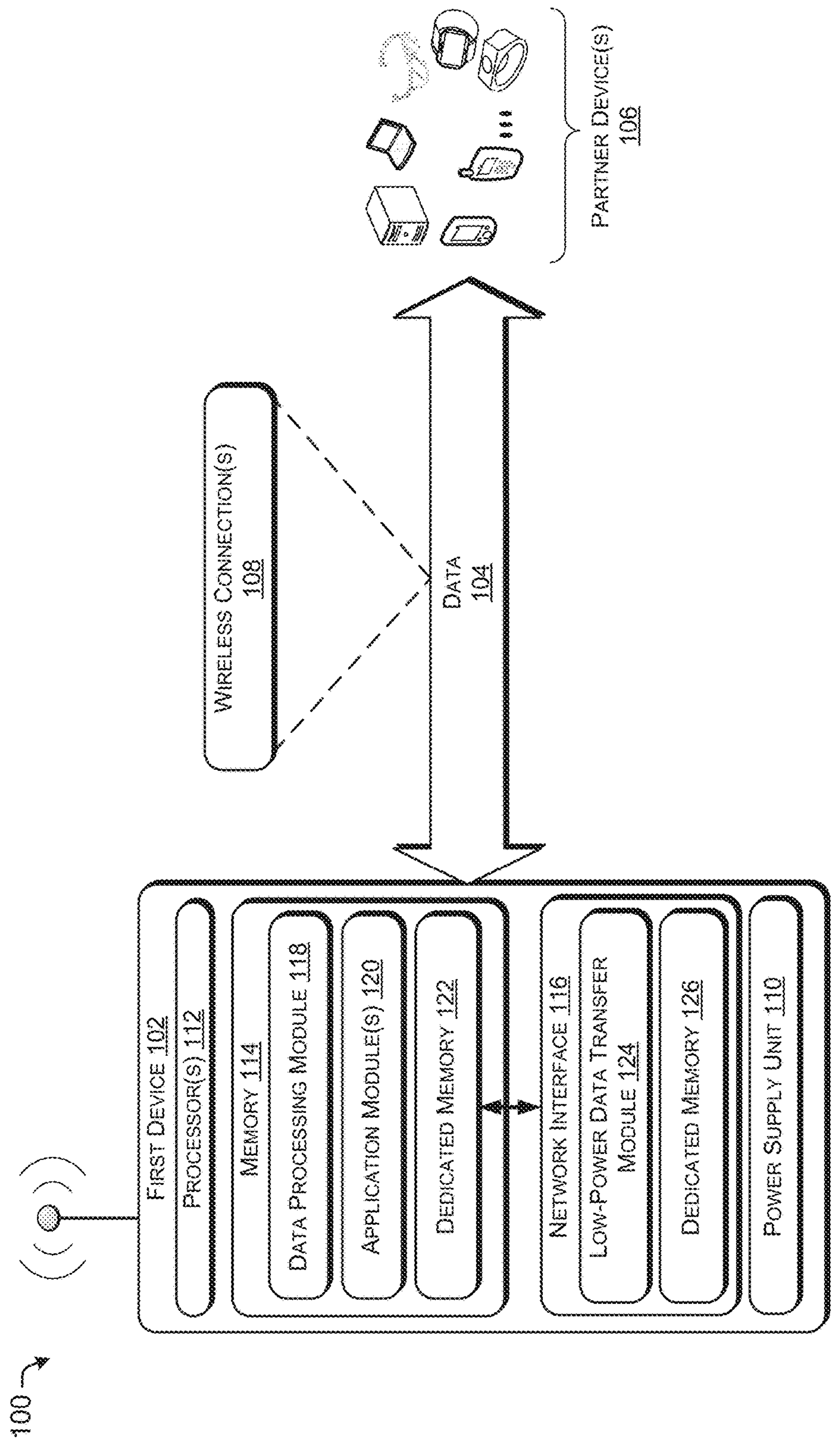
FIG. 1 illustrates an example environment in which the techniques and systems described herein can be implemented, where a device is configured to exchange data with various partner devices via wireless connection(s).

The techniques and systems described herein implement direct memory access in association with a wireless data transfer. Implementation of direct memory access reduces an amount of power consumed by a device (i) to receive and process incoming data and/or (ii) to access and send outgoing data, and therefore, direct memory access extends a life of a power supply of the device. Stated another way, in association with implementing the techniques and systems described herein, a user of the device is less likely to experience an inconvenience associated with (i) a powerless (e.g., dead) wireless device and/or (ii) having to recharge a wireless device at inopportune moments.

In at least one example, the techniques and systems determine that data has been wirelessly transferred, or is to be wirelessly transferred, via low-power consumption data transfer based on a wireless connection characteristic. In response to the determination, the data may be written or read via a direct memory access. In at least another example, the techniques and systems implement low-power consumption data transfer based on instructions to store data at specific storage location(s) so that data can be read from the specific storage location(s) using a direct memory access and/or written to a dedicated memory using a direct memory access. Thus, the data can be transferred without interrupting a main processor of (i) a device from which the data is sent and/or (ii) a device at which the data is received and stored. The techniques and systems configure data transfer settings and communicate the data transfer settings from one device to another device in advance so that direct memory access, e.g., in accordance with the examples provided above, can subsequently be implemented.

As used herein, data may be transferred to and from a wireless device via one or more data units. A data unit may include and/or be referred to as, a data packet, a datagram, a data segment, a data block, a data frame or any other structure or division of data that can be configured to transmit a set or subset of data in a sequence or an order. A data unit discussed herein may be configured and transferred in accordance with various wireless communication protocols. In various examples, a data unit may be associated with an email message, an instant message, a short message, a social application message or notification, gaming information, web information, or other information communicated wirelessly between devices. In further examples, a data unit may be associated with information (e.g., values) detected at a device that includes, or is coupled to, one or more sensors (e.g., image capture sensors, temperature sensors, noise sensors, body/health sensors, movement sensors, etc.). For instance, a wearable device may be configured with, or coupled to, sensor(s) that monitor a heart rate, a blood-sugar level, blood pressure, a number of steps taken while walking or running, etc. The wearable device may be configured with logic to store the monitored values and generate data units to wirelessly communicate the monitored values to another device (e.g., a user's smartphone).

By using the direct memory access described herein, the techniques and systems are able to reduce a rate at which a main processor of a wireless device consumes power when reading or writing data in response to a wireless network request (e.g., receiving data units and/or sending data units) at least because the network request can be handled by bypassing the main processor. Consequently, the techniques and systems described herein are able to extend an amount of time a power supply lasts before it needs to be replenished (e.g., charged).

The techniques and systems described herein are directed to reducing power consumption associated with wireless data transfers involving at least one device that operates via a wireless power supply (e.g., a battery).

Using wireless connections, the techniques and systems are configured to wirelessly transfer data from a memory of a data sending device to a memory of a data receiving device by directly writing data to or reading data from a respective memory without the involvement of a main processor. In at least one example, the data receiving device may receive a data unit from the data sending device (e.g., a partner device or a peer device) and analyze a wireless connection characteristic associated with the data unit to determine if the data unit has been transferred using low-power consumption data transfer. Low-power consumption data transfer is associated with data to be read and/or written via a direct memory access so that power can be conserved at the data sending device, the data receiving device, or both. If the data unit is transferred using low-power consumption transfer, the data receiving device may directly store the data unit in a predetermined memory (e.g., a dedicated memory) of the data receiving device. If the data unit is not transferred using low-power consumption transfer (i.e., a regular data transfer), the data receiving device may store and process the data unit regularly by interrupting the main processor, which causes the consumption of more power.

In at least one other example, the data sending device may collect data, e.g., from one or more sensors, based at least in part on low-power consumption transfer settings agreed upon in advance by the data sending device and the data receiving device. In various implementations, this may be referred to as a publish-subscribe relationship, where the data receiving device (e.g., a smartphone) subscribes to data published by the data sending device (e.g., a wearable device configured to collect, store and transfer data to the smartphone). Based on the agreed upon low-power consumption transfer settings, the data sending device may store the data at specific locations (e.g., a defined range of addresses) in a memory so the data receiving device can retrieve and/or request (e.g., pull) data units to be read from the specific locations without involving a main processor of the data sending device and/or store the data units via direct memory accesses at the data receiving device without involving a main processor.

FIG. 1 illustrates an example environment 100 in which the techniques and systems described herein can be implemented. In the example environment 100, a first device 102 exchanges data 104 (e.g., one or more data units) with various partner device(s) 106 via wireless connection(s) 108. In various implementations, the first device 102 may be the data receiving device and a partner device 106 may be the data sending device.

The first device 102 may include, but is not limited to, a smartphone, a cell phone, a tablet computer, a laptop computer, a personal digital assistant (PDA), an electronic book device, a portable navigation device, a portable gaming device, a wearable device, a personal media player device, an automobile computing device, a desktop computer device, a gaming console device, a server device, or any other electronic device that may exchange data wirelessly (e.g., receive and/or send). In various examples, the first device 102 may be powered by a power supply unit 110 (e.g., a drainable battery or any other power source that can be depleted during operation of the first device 102).

The first device 102 may comprise one or more processor(s) 112, memory 114, a network interface 116 and the aforementioned power supply unit 110. The processor(s) 112 may be a single processing unit or a number of units, each of which could include multiple different processing units. The processor(s) 112 may include a microprocessor, a microcomputer, a microcontroller, a digital signal processor, a central processing unit (CPU), a graphics processing unit (GPU), etc. In various examples, the processor(s) 112 may be referred to as main processor(s). Among other capabilities, the processor(s) 112 may be configured to fetch and execute computer-readable instructions stored in the memory 114.

The memory 114 may include software functionality configured as one or more "modules." As used herein, the term "module" is intended to represent example divisions of the software for purposes of discussion, and is not intended to represent any type of requirement or required method, manner or organization. Accordingly, while various "modules" are discussed, their functionality and/or similar functionality could be arranged differently (e.g., combined into a fewer number of modules, broken into a larger number of modules, etc.). Further, while certain functions and modules are described herein as being implemented by software and/or firmware executable on a processor, in other embodiments, any or all of the modules may be implemented in whole or in part by hardware (e.g., as an Application-Specific Integrated Circuit (ASIC), a specialized processing unit, etc.) to execute the described functions. In some instances, the functions and/or modules are implemented as part of, or in association with, an operating system. In other instances, the functions and/or modules are implemented as part of a device driver, firmware, and so on. In various examples, the memory 114 may be referred to as main memory.

The memory 114 may include one or a combination of computer readable media. Computer readable media may include computer storage media and/or communication media. Computer storage media includes volatile and non-volatile, removable and non-removable media implemented in any method or technology for storage of information such as computer readable instructions, data structures, program modules, or other data. Computer storage media includes, but is not limited to, phase change memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), or any other non-transmission medium that can be used to store information for access by a computing device.

In contrast, communication media may embody computer readable instructions, data structures, program modules, or other data in a modulated data signal, such as a carrier wave, or other transmission mechanism. As defined herein, computer storage media does not include communication media.

The network interface 116 enables the first device 102 to receive the data 104 from a partner device 106 and/or send the data 104 to the partner device 106 in accordance with various types of communications via the wireless connection(s) 108. For example, the various types of communications may include Wi-Fi, 3G, Bluetooth, Long-Term Evolution (e.g., 4G LTE), wireless USB, ZigBee, etc. Accordingly, the wireless connection(s) 108 may be established via cellular or mobile networks, Local Area Networks (LANs), Wide Area Networks (WANs), Personal Area Networks (PANs), short-range communication networks, etc.

A partner device 106 may include, but is not limited to, a wearable device (e.g., a watch, electronic glasses, an activity or fitness monitoring device, etc.), a home device (e.g., an imaging device such as a camera, a thermostat device, a garage door device, an appliance monitoring device, etc.), a smartphone, a cell phone, a tablet computer, a laptop computer, a personal digital assistant (PDA), an electronic book device, a portable navigation device, a portable gaming device, a personal media player device, an automobile computing device, a desktop computing device, a gaming console, a server device (e.g., configured in a cloud environment or a server farm), or any other electronic device that may exchange data wirelessly (e.g., receive and/or send) with the first device 102. Thus, a partner device 106 may be a mobile device or a stationary device.

The memory 114 may include a data processing module 118, application module(s) 120, and/or a dedicated memory 122 to implement direct memory access, each of which is further discussed herein. In various implementations, the data processing module 118 may be part of an operating system of the wireless device 102 that is executable by, or in association with, the processor(s) 112 to process data. The application module(s) 120 may include pre-installed and/or user-installed executable functionality and/or applications (e.g., "apps") that may operate based in part on data communications. For instance, the application module(s) 120 may include, but are not limited to: email applications, instant messaging applications, social networking applications, gaming applications, health monitoring applications (e.g., to monitor and report heart rate, blood-sugar level, blood pressure, etc.), exercise monitoring applications (e.g., to monitor and report distance traveled, number of steps, velocity of movement, number of calories burned, etc.), home monitoring applications (e.g., to monitor and control temperature, security, home appliances, garage door, pet mechanisms, etc.), and/or other data exchange applications configured to transfer data 104.

The network interface 116 may include a low-power data transfer module 124 and/or a dedicated memory 126 to implement direct memory access. The dedicated memory 126 may be an alternative of, or an addition to, the dedicated memory 122. Memory may be referred to as "dedicated" memory at least because the memory may not be shared. For instance, dedicated memory 122 and/or dedicated memory 126 may be reserved solely for the network interface 116 to store and/or access data units via direct memory accesses (e.g., data received via low-power consumption transfer or data to be sent via low-power consumption data transfer). Thus, the network interface 116 is configured to determine that it has a dedicated, or private, memory that an operating system will not allocate to other functions or processes of the wireless device 102.

In various examples, the low-power data transfer module 124 may include, or in some way be associated with, one or more hardware logic components. For instance, and without limitation, illustrative types of hardware logic components that can be used include an ASIC, a Field-Programmable Gate Array (FPGA), a state machine, a Complex Programmable Logic Device (CPLD), other logic circuitry, a system on chip (SoC), and/or any other device components that can manipulate and analyze information, e.g., a data unit received from a partner device 106, based on operational instructions. Accordingly, the network interface 116 may include, for example, ROM or some readable memory storing instructions (e.g., firmware) and a controller/processor for executing the instructions to perform the functions described herein.

The low-power data transfer module 124 is configured to implement low-power consumption transfer of data units without interrupting a main processor 112. In at least one example, the low-power data transfer module 124 determines that wirelessly transferred data is to be stored via a direct memory access based on a wireless connection characteristic. In at least one other example, the low-power data transfer module 124 stores wirelessly transferred data via a direct memory access based on whether or not the data is read from specific storage location(s) at a partner device 106 (e.g., a publish-subscribe relationship). In at least one further example, the data may be read from the specific storage location(s) by a network interface of the partner device via direct memory access in response to a read request from the low-power data transfer module 124 of the first device 102. Accordingly, implementation of the low-power data transfer module 124 in the network interface 116 conserves power of the power supply unit 110 (e.g., reduces a rate at which power is consumed) at least because the low-power data transfer module 124 is capable of handling and directly storing incoming data units for the application module(s) 120 without interrupting a main processor. Additionally, the low-power data transfer module 124 may handle data read requests via direct memory access without interrupting a main processor. For example, the main processor 112 may be in a sleep mode and the low-power data transfer module 124 is capable of handling and directly storing incoming data units for the application module(s) 120 without sending a notification to wake up the main processor from the sleep mode upon receiving the incoming data units.

The low-power data transfer module 124 may directly store the incoming data units in at least one of the dedicated memory 122 or the dedicated memory 126 for a temporary period of time. For instance, the low-power data transfer module 124 may be configured to monitor the dedicated memory 122, the dedicated memory 126 and/or the power supply 110 and determine that a condition exists to cause the main processor 112 to be interrupted so that it can process the data units that were temporarily stored in at least one of the dedicated memory 122 or the dedicated memory 126. In a first example, the condition may indicate that a number of data units stored exceeds a pre-defined threshold number of data units, and thus, the low-power data transfer module 124 generates a notification to interrupt the main processor 112 so the main processor 112 can process the data units. In a second example, the condition may indicate that available storage space in the dedicated memory 122 or the dedicated memory 126 is below a pre-defined threshold storage space, and thus, the low-power data transfer module 124 generates a notification to interrupt the main processor 112 so the main processor 112 can process the data units. In a third example where the dedicated memory 122 or the dedicated memory 126 comprises volatile memory and to protect against loss of the information in case of a power outage (e.g., the first device 102 shuts off), the condition may indicate that available power of the power supply 110 is below a threshold amount of available power (e.g., %5 battery life remaining, 10% battery life remaining, etc.), and thus, the low-power data transfer module 124 generates a notification to interrupt the main processor 112 so the main processor 112 can process the data units (e.g., the data units are flushed from the dedicated memory 122 or the dedicated memory 126)

Figure 2:
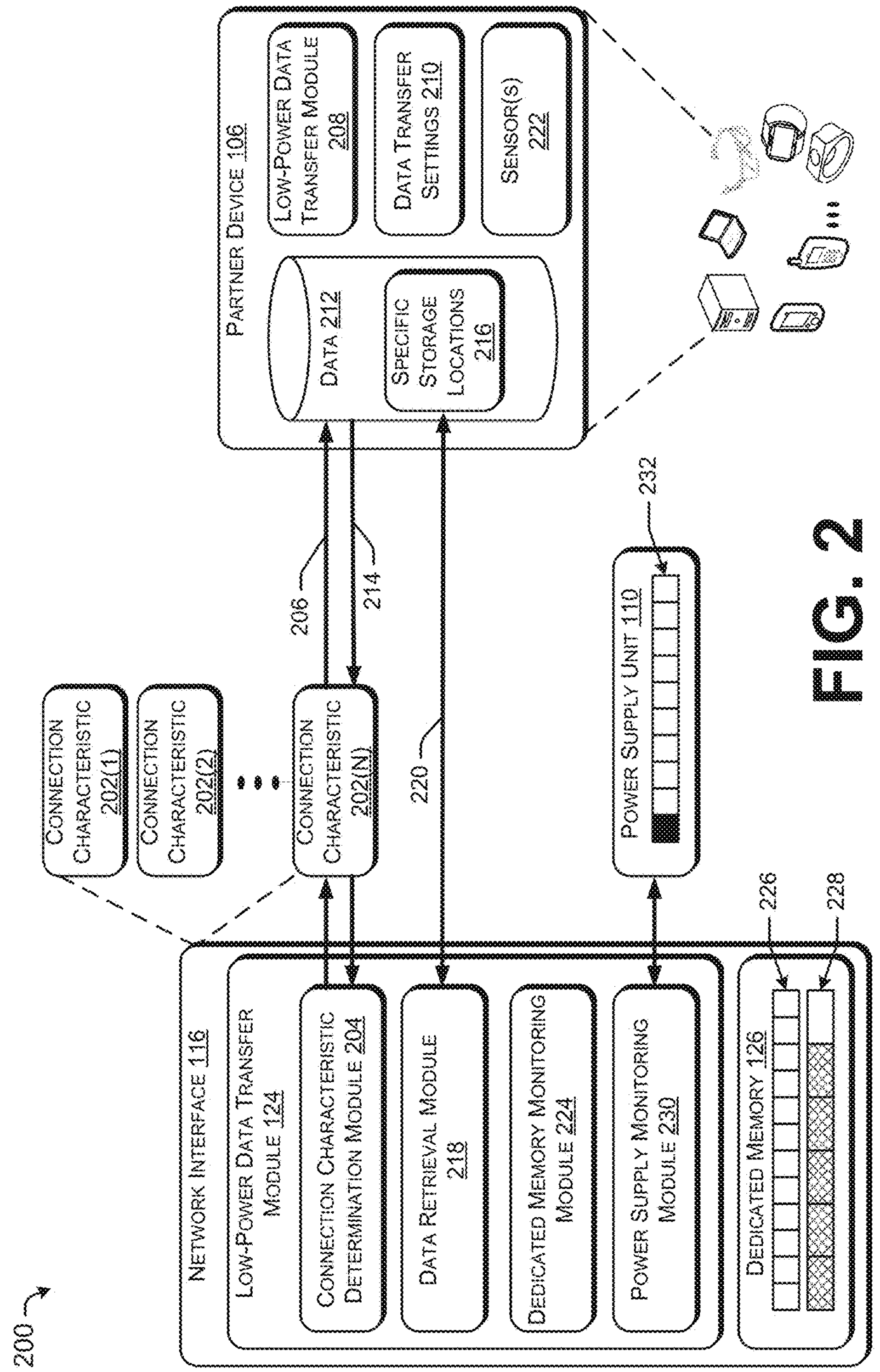
FIG. 2 illustrates a more detailed view of (i) a network interface of a data receiving device, (ii) a data sending partner device, and (iii) a low-power consumption wireless data transfer between the network interface of the data receiving device and the data sending partner device.

FIG. 2 illustrates a more detailed view of the network interface 116, of a partner device 106, and of the low-power consumption wireless data transfer, between the network interface 116 and the partner device 106, as discussed above with respect to FIG. 1.

As mentioned above, in at least one example, the low-power data transfer module 124 may determine that wirelessly transferred data is to be stored via a direct memory access based on a wireless connection characteristic. For instance, the low-power data transfer module 124 may be configured to exchange data via a variety of different wireless connection characteristics 202(1) . . . 202(N), where N is an integer number, and the low-power data transfer module 124 may assign a particular connection characteristic (e.g., 202(N)) to low-power consumption data transfer so that data units can be stored via direct memory access without interruption of a main processor 112 (e.g., which consumes more power). Accordingly, the low-power data transfer module 124 may comprise a connection characteristic determination module 204 configured to determine that a received data unit is a data unit to be stored without interrupting a main processor 112 if the received data unit is wirelessly communicated in accordance with the connection characteristic (e.g., 202(N)) that is assigned to low-power consumption data transfer.

The connection characteristic (e.g., 202(N)) assigned to the low-power consumption data transfer may be communicated 206 by the low-power data transfer module 124 to a low-power data transfer module 208 operating on the partner device 106 so that the partner device 106 is informed and aware of the assigned connection characteristic (e.g., 202(N)). The low-power data transfer module 208 may store the assigned connection characteristic (e.g., 202(N)) as a data transfer setting 210 so that the low-power data transfer module 208 can subsequently configure data 212 for communication 214 to the network interface 116 of the wireless device 102 in accordance with the assigned connection characteristic (e.g., 202(N)). In some implementations, the partner device 106 may use the assigned connection characteristic (e.g., 202(N)) to request that the low-power data transfer module 124 of the first device 102 directly access and provide data to the partner device 106 without involvement of a main processor 112 of the first device 102.

In various implementations, the assigned connection characteristic (e.g., 202(N)) may include a particular port of a variety of available ports used by the network interface 116 for data transfer. For example, a network port may serve as a communications endpoint for data exchanges and a network port may uniquely identify different applications and/or processes running on the wireless device 102. Accordingly, a particular network port may be assigned to accessing memory directly without involving a main processor. In an example context of the Internet Protocol (IP), a port may be associated with an IP address of a host (e.g., the first device 102) and/or a type of protocol used for communication, such as the Transmission Control Protocol (TCP). A network port may be identified by a 16-bit number, e.g., a port number. The port number, added to an IP address, may complete the destination address for data units to be stored via a direct memory access without interrupting a main processor 112. In another example context, a Bluetooth port enables connections to be established for Bluetooth-enabled devices. Using Bluetooth communications, an incoming Bluetooth port enables the reception of data units to be stored via a direct memory access without interrupting a main processor 112 and an outgoing Bluetooth port enables the transmission of data units read via direct memory access without interrupting a main processor 112.

In various implementations, the assigned connection characteristic (e.g., 202(N)) may include a specific data transfer protocol (e.g., Bluetooth) of a variety of data transfer protocols used by the network interface 116 to exchange data. Thus, the connection characteristic determination module 204 may determine that data communicated via the specific data transfer protocol (e.g., Bluetooth) is to be stored via a direct memory access without interrupting a main processor 112 while other data communicated via other data transfer protocols (e.g., TCP) is to be stored and processed regularly by interrupting the main processor 112.

In various implementations, the connection characteristic determination module 204 may be configured to send a TCP level "SYN" or a TCP level "ACK" to the partner device 106 in response to receiving a data unit via TCP. Accordingly, the connection characteristic determination module 204 may be configured as a TCP offload engine that executes at least part of a TCP stack so that reception of a second data unit in a sequence of data units does not depend on an acknowledgement that a main processor 112 has processed a first data unit in the sequence communicated before the second data unit. Rather, reception of the first data unit can be acknowledged by the connection characteristic determination module 204 in the network interface 116 thereby enabling the reception of subsequent data units in the sequence of data units without having to interrupt the main processor 112.

In various implementations, the assigned connection characteristic (e.g., 202(N)) may be an identifiable flag of a data unit. For example, a TCP/IP header may be configured, e.g., by a partner device 106, to include a bit set to indicate low-power consumption data transfer. In another example, a data unit may be configured, e.g., by a partner device 106, to include a signature and/or fingerprint indicating low-power consumption data transfer.

In at least one additional example, the low-power data transfer module 124 stores wirelessly transferred data via a direct memory access based on whether or not the data is retrieved (e.g., pulled) from specific storage location(s) 216 at the partner device 106. For instance, the low-power data transfer module 124 may comprise a data retrieval module 218 configured to (i) request and/or read 220 data stored at the specific storage location(s) 216 (e.g., addresses, partitions, logical storage units, etc.) via direct memory accesses and without interrupting a main processor of the partner device and/or (ii) store the data via a direct memory access without interrupting the main processor 112 without interrupting a main processor 112 of the first device 102. In some examples, this retrieval may be referred to as a publish-subscribe implementation where the partner device 106 is configured to publish data at the specific storage location(s) 216 in its own memory so that the published data can be subscribed to by other devices (e.g., the first device 102) in accordance with low-power consumption data transfer. For instance, the partner device 106 may be a wearable device attached to a human body and configured with sensor(s) 222 to collect and monitor information (e.g., a heart rate, a blood-sugar level, etc.) associated with the health of a user. The low-power data transfer module 208 can publish the values detected by the sensors at the specific storage location(s) 216 so that the values can be directly accessed (e.g., read) without interrupting a main processor of the partner device. Consequently, the values can be provided to subscribed devices and the subscribed devices can also directly store the values without interrupting a main processor 112. Thus, a subscribed device executing a health monitoring application could receive sensor values aggregated over a period of time and from a variety of wearable devices positioned on the body via low-power consumption data transfer and process all the received sensor values at a later time to conserve power (e.g., after a ten mile run is completed).

Identification of the specific storage location(s) 216 may be exchanged between the low-power data transfer module 124 and the low-power data transfer module 208 operating on the partner device 106 so that the devices are informed and aware of the specific storage location(s) 216. The low-power data transfer module 208 may then store the specific storage location(s) 216 as a data transfer setting 210 so that the low-power data transfer module 208 can subsequently store, or publish, the data for low-power consumption retrieval via the specific storage location(s) 216.

As discussed above, the data transfer settings 210 may include a particular connection characteristic (e.g., 202(N)) and/or the specific storage location(s) 216 so that low-power consumption data transfer can be implemented. Additionally or alternatively, the data transfer settings 210 may include a type of data to be transferred via low-power consumption data transfer (e.g., a user may want their smartphone to aggregate values associated with a heart rate during a run but not values associated with body temperature), a threshold size or amount of data to be transferred via low-power consumption data transfer (e.g. if less than 64 kilobytes of data is to be sent then low-power consumption data transfer is to be implemented but if more than 64 kilobytes of data is to be sent then regular data transfer is to be implemented), and one or more triggers that cause the transfer of data to be switched from low-power consumption data transfer to regular data transfer (e.g., immediately interrupt the main processor 112 to generate a notification to the user that a detected heart rate value has exceeded a pre-defined limit or threshold). The data transfer settings 210 may be determined by an operating system or an application module 120 of the first device 102 (e.g., default settings) or the data transfer settings may be configured based on input received from a user of a device (e.g., user defined settings applicable to execution of a particular application module 120).

In various examples, the low-power data transfer module 124 may include a dedicated memory monitoring module 224. The dedicated memory monitoring module 224 is configured to monitor the dedicated memory 126 (e.g., or the dedicated memory 122) and determine if a condition to cause interruption of a main processor 112 exists. In one implementation, the condition may be associated with a determination that a number of stored data units exceeds a threshold number (e.g., ten, one hundred, one thousand, etc.). In FIG. 2, reference 226 illustrates, as an example, that twelve data units have been stored in dedicated memory 126 and if the threshold number is twelve, then the dedicated memory monitoring module 224 determines that a condition exists to interrupt the main processor 112 to process the twelve data units. The number of data units stored may correlate to a total amount of data to be processed, and therefore, the threshold number of data units may correlate to a threshold amount of data to be processed (e.g., 500 kilobytes, 1000 kilobytes, etc.). In another implementation, the condition may be associated with a determination that available memory space in the dedicated memory 126 is below a threshold amount of space. In FIG. 2, reference 228 illustrates, as an example, that less than twenty percent capacity remains (e.g., five of six memory units are already storing low-power consumption data), and therefore, if the threshold amount of space is twenty percent then the dedicated memory monitoring module 224 determines that a condition exists to interrupt the main processor 112 to process the data units stored in the dedicated memory 126.

In various examples, the low-power data transfer module 124 may include a power supply monitoring module 230. The power supply monitoring module 230 is configured to monitor the power supply unit 110 and determine if a condition to cause interruption of a main processor 112 exists. This condition may be associated with a determination that an available amount of power supply is below a threshold amount of power supply. In FIG. 2, reference 232 illustrates, as an example, that only ten percent of power supply life remains (e.g., only one of ten power supply units is available), and therefore, if the threshold amount of power supply is eleven percent then the power supply monitoring module 230 determines that a conditions exists to interrupt the main processor 112 to process the data units stored in the dedicated memory 126.

In at least one additional example, data units stored in dedicated memory 126 may be processed in response to a user action (e.g., a user request to update an email inbox, a user interaction with an application executing on the wireless device, etc.).

FIGS. 3-8 illustrate example processes for employing the techniques and systems described herein. For ease of illustration, the example processes are described as being performed in the environment of FIG. 1, FIG. 2, or a combination of FIG. 1 and FIG. 2. For example, one or more of the individual operations of the example processes may be performed by the first device 102 and/or a partner device 106. However, processes may be performed in other environments and by other devices as well.

The example processes are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, configure a device to perform the recited operations. Generally, computer-executable instructions include routines, programs, objects, components, data structures, and the like that perform particular functions. The order in which the operations are described is not intended to be construed as a limitation, and any number of the described operations can be combined in any order and/or in parallel to implement the process. Further, any of the individual operations may be omitted.

Figure 3:
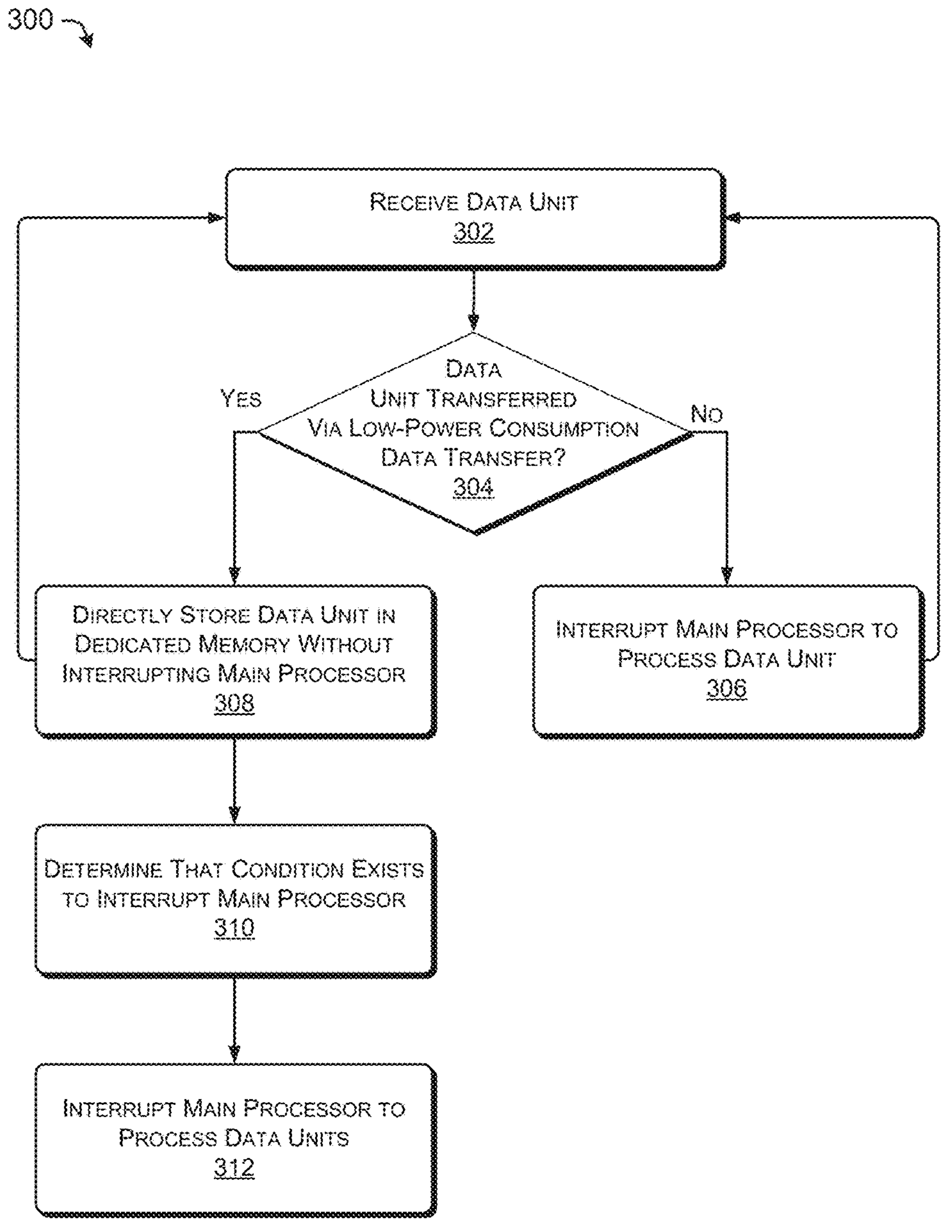
FIG. 3 illustrates an example process that determines if a received data unit has been transferred via low-power consumption transfer, and if so, stores the data unit via a direct memory access without interrupting a main processor.

FIG. 3 illustrates an example process 300 that determines if a data unit has been transferred using low-power consumption data transfer, and if so, stores the data unit via a direct memory access without interrupting a main processor.

At 302, a data unit is received. For example, the network interface 116 of the first device 102 may receive the data unit from a partner device 106. In at least one example implementation, the partner device 106 is a wearable device configured to collect and aggregate values detected by sensors so that an application (e.g., a health and/or fitness application) executing on the first device 102 (e.g., a smartphone device) can implement functionality based on the detected values.

At decision 304, it is determined whether the data unit has been transferred using low-power consumption data transfer. For example, the connection characteristic determination module 204 may determine if the data unit was communicated with a particular connection characteristic assigned to low-power consumption data transfer, as discussed above with respect to FIG. 2.

If it is determined at decision 304 that the data unit was not transferred via low-power consumption data transfer (i.e., "No" at decision 304), then the process proceeds to 306 where a main processor is interrupted to process the data unit transferred via regular data transfer that consumes more power compared to the low-power consumption data transfer. For example, the low-power data transfer module 124 may generate a notification that causes a main processor 112 and/or the data processing module 118 to wake up and process the data unit. From 306, the process may return to 302 where another data unit may be received.

If it is determined at decision 304 that the data unit was transferred via the low-power consumption data transfer (i.e., "Yes" at decision 304), then the process proceeds to 308 where the data unit is directly stored in a dedicated memory without interrupting a main processor. For example, the low-power data transfer module 124 may store the data unit directly in dedicated memory 122 or dedicated memory 126. By directly storing a wirelessly transferred data unit, a main processor 112 does not consume power to wake up and go back to sleep each time a data unit, or a set of data units, is received. Rather, power consumption associated with waking up the main processor 112 is spread across multiple data units (e.g., tens, hundreds, thousands, etc.) or multiple sets of data units. For example, the main processor 112 may be interrupted to process multiple messages, notifications and/or detected values received over a period of time (e.g., thirty minutes, one hour, etc.) instead of being interrupted each time a message, a notification or a detected value is received. From 308, the process may return to 302 where another data unit may be received.

At 310, it is determined that a condition exists to interrupt the main processor to process the data units stored via direct memory accesses. For example, the condition may specify that a number of data units exceeds a threshold number or a total amount of data stored via direct memory access exceeds a threshold total amount. In another example, the condition may specify that available memory space in a dedicated memory (e.g., 122 or 126) has fallen below a threshold amount of available memory space. In yet another example, the condition may specify that available power supply has fallen below an available power supply threshold and the low-power consumption data units should be processed so that information will not be lost (e.g., if the dedicated memory is volatile and it is possible the power may soon run out).

At 312, the main processor is interrupted to process the data units. For example, the low-power data transfer module 124 may generate a notification that causes a main processor 112 and/or the data processing module 118 to wake up and process the data units that have been previously stored in a dedicated memory.

As an example scenario, the process 300 may be implemented by a smartphone of a user so that health and fitness data collected by a Bluetooth enabled wearable device can be received and directly stored without interrupting a main processor of the smartphone while the user is exercising (e.g., on a ten mile run). Moreover, a network interface of the wearable device may provide the health and fitness data via direct memory access without interrupting a main processor of the wearable device. After the user finishes exercising, the smartphone can process the received data and display the health and fitness information associated with the activity. This conserves power of the smartphone because a main processor of the smartphone is not interrupted each time a data unit is received. In some instances, the smartphone may be configured to immediately interrupt (e.g., wake up) a main processor to process other data during the ten mile run, such as a notification associated with an important message. As an example, this notification may be communicated via TCP over a mobile telephone network instead of Bluetooth so that the connection characteristic determination module 204 can distinguish between low-power consumption data transfer and regular data transfer.

Figure 4:
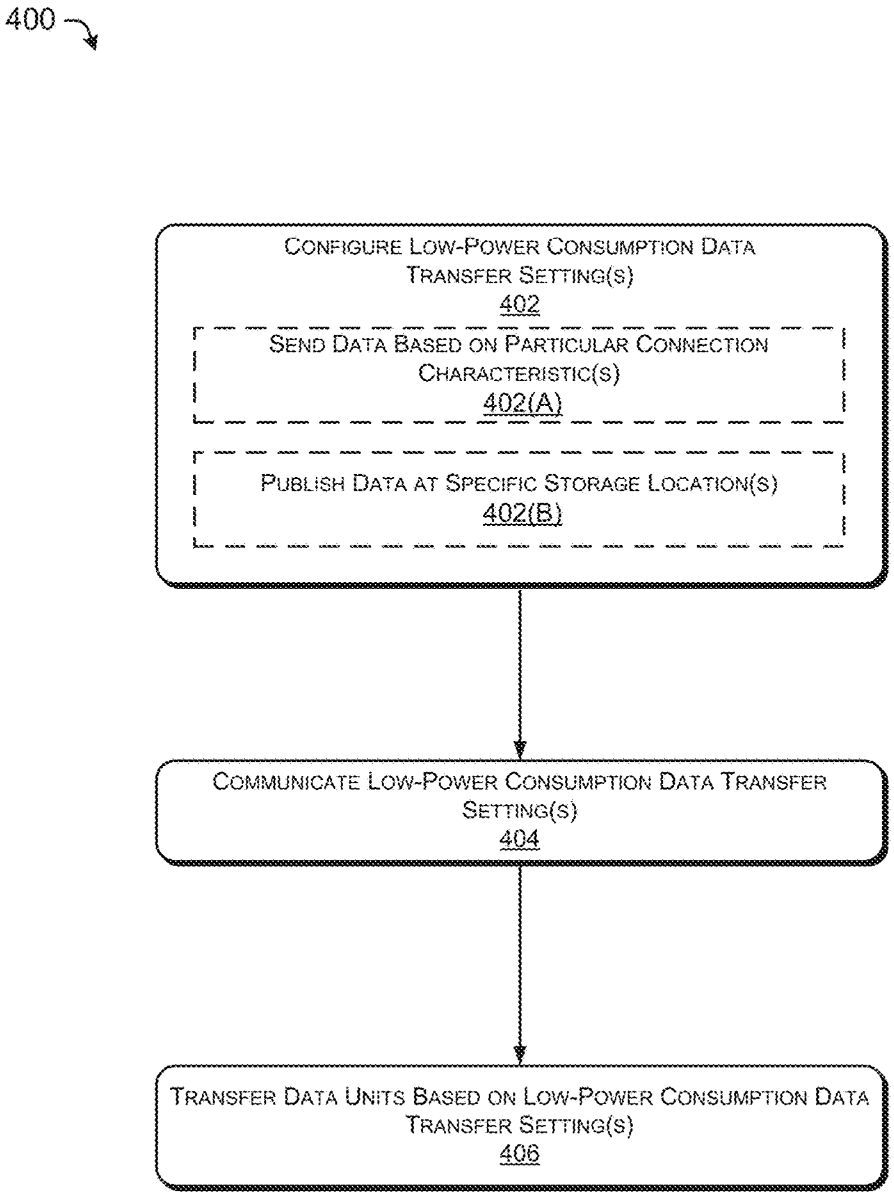
FIG. 4 illustrates an example process that configures and communicates low-power consumption data transfer settings.

FIG. 4 illustrates an example process 400 that configures and communicates low-power consumption data transfer settings.

At 402, low-power consumption data transfer settings are configured. For example, a low-power consumption data transfer setting may specify that low-power consumption data units are to be transferred in accordance with a particular connection characteristic 402(A) or that a partner device is to publish data for low-power consumption transfer at specific storage location(s) 402(B). The low-power data transfer module 124 may define low-power consumption data transfer settings based on instructions received from the data processing module 118 and/or the application module(s) 120. For instance, an application module 120 may be configured with a default setting or a user-defined setting specifying that values detected by sensors of a partner device 106 are to be transferred via low-power consumption data transfer based on a particular connection characteristic (e.g., a network port, a communication protocol such as Bluetooth, etc.).

At 404, the low-power consumption data transfer settings are communicated from one device to another. For example, the first device 102 may communicate the low-power consumption data transfer settings to one or more partner devices 106 so that data can be configured and/or stored to enable direct memory access at the first device 102 thereby conserving power of the first device 102. In another example, the first device 102 and a partner device 106 may agree upon the low-power consumption data transfer settings so that data can be configured and/or stored to enable direct memory access at the partner device 106 (e.g., a direct read from specific storage locations) and the first device 102 (e.g., a direct write to a dedicated memory) thereby conserving power of a power supply of the first device 102 or the partner device 106.

At 406, the low-power consumption data units are transferred in accordance with the low-power consumption data transfer settings. For example, the connection characteristic determination module 204 may determine that a data unit has been transferred via low-power consumption data transfer based on a connection characteristic associated with the data unit (e.g., a network port, a particular communication protocol, etc.). In another example, the data retrieval module 218 may request data from specific storage location(s) 216 of a partner device 106, and store the requested data in a dedicated memory (e.g., 122 or 126) via a direct memory access without interrupting a main processor 112 of the first device 102 and/or a main processor of a partner device 106.

Figure 5:
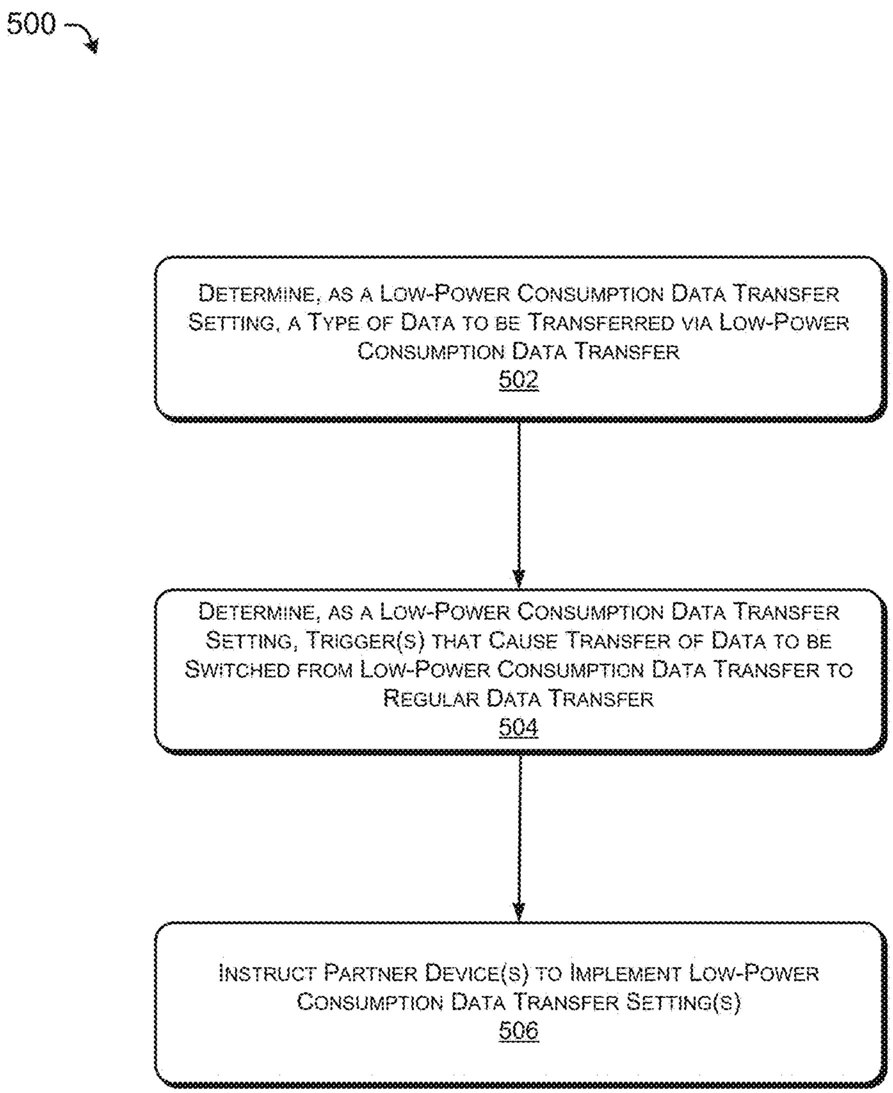
FIG. 5 illustrates an example process that determines additional low-power consumption data transfer settings.

FIG. 5 illustrates an example process 500 that determines low-power consumption data transfer settings in addition to those discussed above with respect to FIG. 4.

At 502, a type of data to be transferred via low-power consumption data transfer is determined to be a low-power consumption data transfer setting. For example, initiation of an application module 120 may be associated with prompts asking a user to provide input so that power consumption settings associated with execution of the application module 120 can be determined based on the transfer of data. In various implementations, the prompts may ask what types of data the user wants a first device 106 to receive and process (e.g., heart rate data but not blood-sugar level data detected by a wearable device) and/or how often the user wants to view the received and processed data (e.g., every thirty seconds of a run, every five minutes of the run, at the end of the run, etc.). The prompts may be presented with an indication that power of a power supply can be conserved if the data does not need to be processed and viewed frequently. The input from the user may help determine what types of data are to be transferred via low-power consumption data transfer and stored via direct memory access. For instance, information which the user wants to view frequently (e.g., every thirty seconds of a ten mile run) may be transferred via regular data transfer so that a main processor 112 is immediately interrupted to process received or retrieved data units so that they can be viewed by the user. Information which the user does not want to view frequently (e.g., view at the end of a ten mile run) may be transferred via low-power consumption data transfer so that the data can be stored via a direct memory access without immediately interrupting a main processor 112.

At 504, trigger(s) that cause the transfer of data, e.g., of a particular type, to be switched from low-power consumption data transfer to regular data transfer are determined to be a low-power consumption data transfer setting. For example, an application module 120 may be configured to process information associated with a heart rate of a user over a period of time (e.g., a ten mile run), and the application module 120 may communicate with a wearable device that is the partner device 106. To conserve power, heart rate values detected at the wearable device may be transferred via low-power consumption data transfer so that they can be processed and viewed by the user at a later time (e.g., at the end of the ten mile run). However, the user may want to immediately be notified if a detected heart rate value exceeds a threshold value so the user can slow down or rest (e.g., a value that is unhealthy or even dangerous and needs to be lowered). Thus, a low-power consumption data transfer setting can define a trigger that indicates a data unit, e.g., associated with an unhealthy or dangerous heart rate value, is to be transferred via regular data transfer that immediately interrupts a main processor 112 to process the data and to generate a displayable notification or warning to the user. Therefore, the wearable device, in accordance with the low-power consumption data transfer setting defined by the user and application module 120 and communicated to the wearable device, is configured to detect the trigger and switch transfer of a particular type of data (e.g., heart rate values) from low-power consumption data transfer to regular data transfer.

At 506, partner devices are instructed to implement the low-power consumption data transfer settings determined in operations 502 and/or 504. For example, the first device 102 may send instructions to partner devices 106 prior to data being collected at, and transferred by, the partner devices 106.

Figure 6:
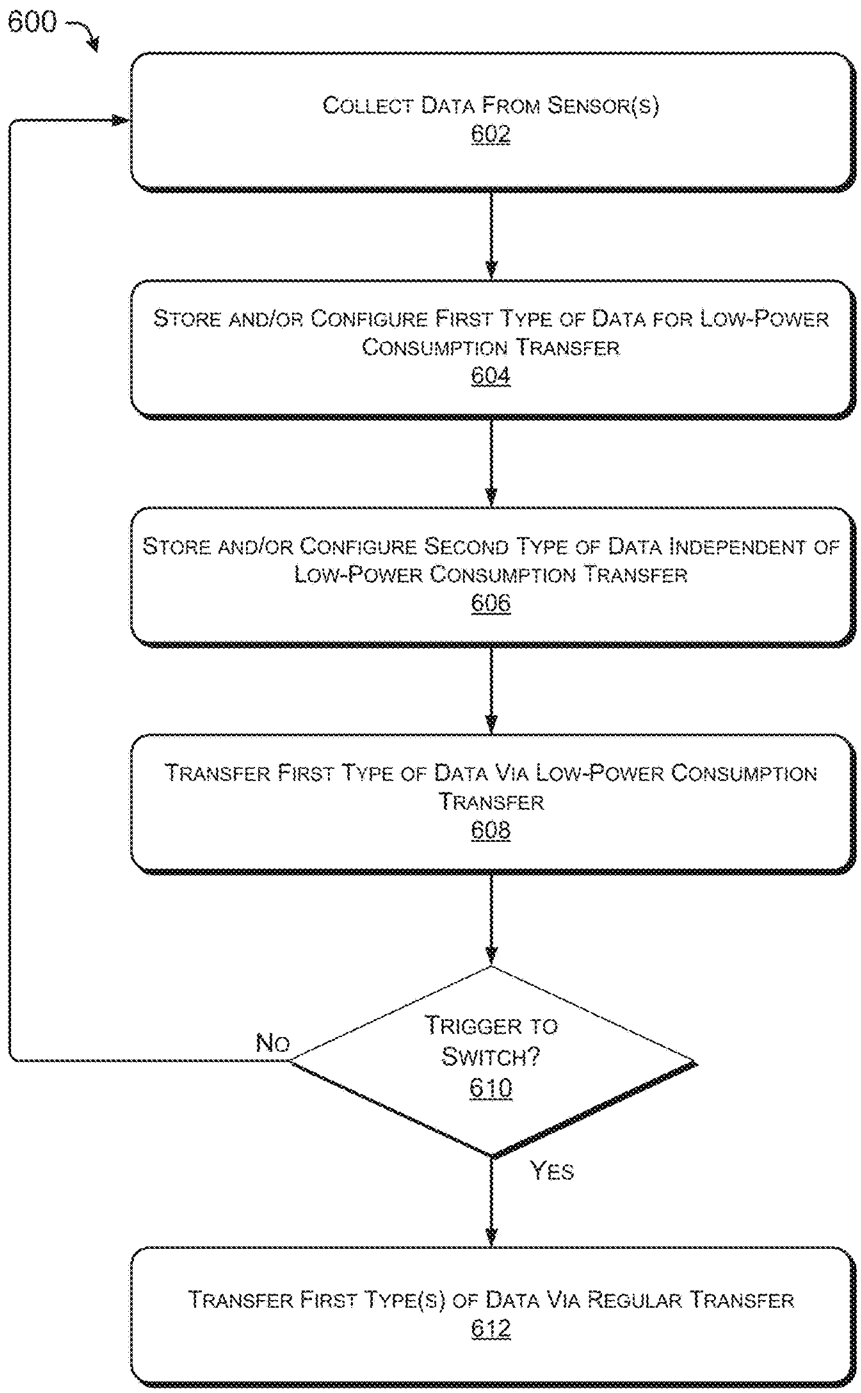
FIG. 6 illustrates an example process that configures and transfers data to a wireless device in accordance with low-power consumption transfer.

FIG. 6 illustrates an example process 600 that configures and transfers data in accordance with low-power consumption data transfer.

At 602, data (e.g., measured values) are collected from sensors that are part of, or coupled to, a partner device. As discussed above, the data collected may be associated with, or used by, functionality performed by an application module 120 executing on a first device 102 in wireless communication with a partner device 106.

At 604, a first type of data is stored and/or configured for low-power consumption transfer based at least in part on previously received data transfer settings. For example, user input associated with an application module 120 may indicate that the user is interested in viewing heart rate information detecting during a ten mile run but that the user will not view the heart rate information until the ten mile run is completed.

At 606, a second type of data is stored and/or configured based at least in part on previously received data transfer settings so that the data will not be transferred via low-power consumption transfer. For example, a second type of data may be transferred via regular data transfer or the second type of data may not need to be transferred at all. Accordingly, the second type of data may be stored on a partner device in storage locations other than the specific storage locations 216 designated for low-power consumption data transfer. Or, the second type of data may be configured for transfer using a network port other than the particular network port assigned to low-power consumption data transfer.

At 608, the first type of data is transferred via low-power consumption data transfer. For example, data units configured to transfer the first type of data may be transferred in accordance with a particular connection characteristic. In another example, the first type of data may be directly accessed (e.g., without interrupting a main processor of the partner device 106) and transferred in response to a read request received from the first device 102, the read request identifying the specific storage locations 216 of the partner device 106.

At decision 610, it is determined if there is a trigger to switch from the low-power consumption transfer to a regular transfer. As discussed above, the trigger may be defined via a low-power consumption data transfer setting. For example, the trigger may be associated with a threshold value such that if a detected value of the first type of data meets or exceeds the threshold value, the switch may be triggered (e.g., a user may want to be notified of a heart rate value that is unhealthy).

If "No" at decision 610, then the process returns to 602 and the first type of data is continued to be collected, stored and/or transferred via low-power consumption data transfer. If "Yes" at decision 610, then the process proceeds to 612 where the transfer of the first type of data is switched from low-power consumption data transfer to regular data transfer so that the information transferred can immediately be processed (e.g., the smartphone can generate a notification of a high heart rate to be displayed to a user on a ten mile run).

Figure 7:
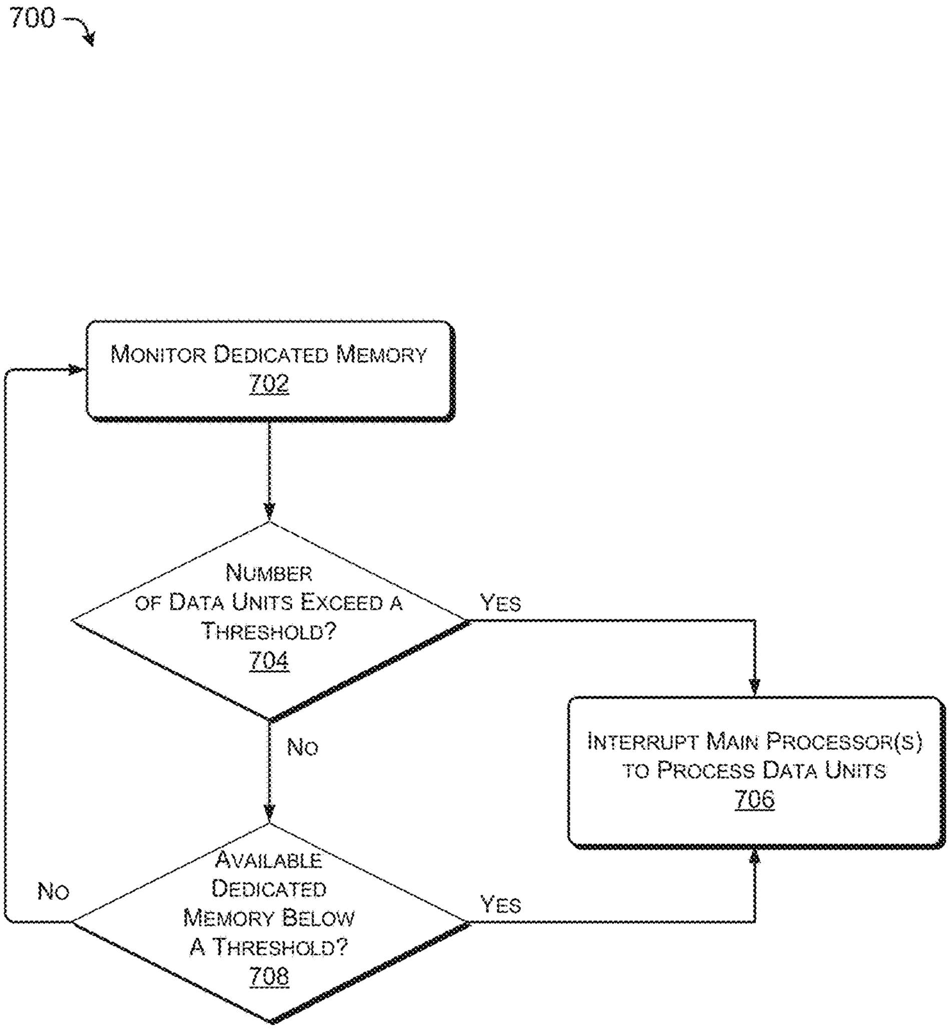
FIG. 7 illustrates an example process that monitors a dedicated memory storing data units to determine if a condition exists to interrupt a main processor to process the data units.

FIG. 7 illustrates an example process 700 that monitors a dedicated memory storing data units to determine if a condition exists to process the data units.

At 702, a dedicated memory is monitored. For example, the dedicated memory monitoring module 224 may monitor dedicated memory 122 or dedicated memory 126.

At decision 704, it is determined if a number of data units stored in the dedicated memory exceeds a threshold number of data units. If "Yes" at decision 704, then the process proceeds to 706 where a main processor is interrupted (e.g., woken up) to process the data units stored in the dedicated memory.

If "No" at decision 704, then the process proceeds to decision 708 where it is determined if an available amount of memory space of the dedicated memory is below a threshold amount of memory space. If "Yes" at decision 708, then the process proceeds to 706 where a main processor is interrupted (e.g., woken up) to process the data units stored in the dedicated memory. If "No" at decision 708, then the process returns to 702 and continues to monitor the dedicated memory.

Figure 8:
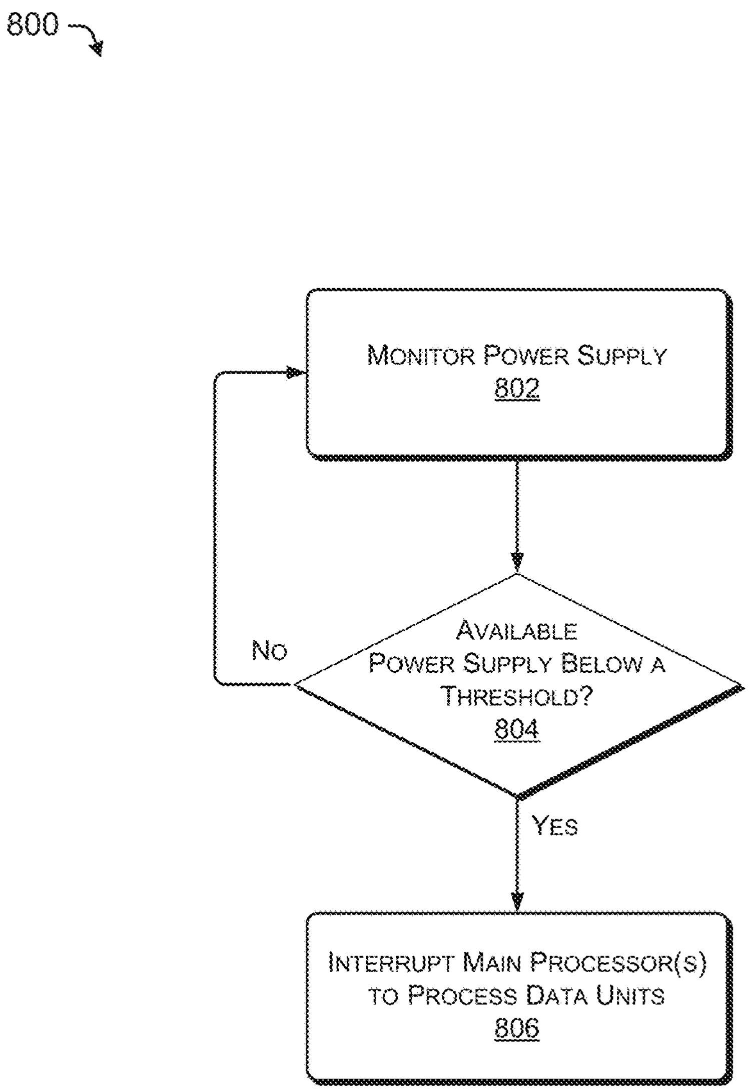
FIG. 8 illustrates an example process that monitors a power supply to determine if a condition exists to interrupt a main processor to process the data units stored in a dedicated memory.

FIG. 8 illustrates an example process 800 that monitors a power supply to determine if a condition exists to process the data units stored in a dedicated memory.

At 802, a power supply of a wireless device is monitored. For example, the power supply monitoring module 230 monitors a power supply 110 of a wireless device.

At decision 804, it is determined if an available amount of power supply is below a threshold amount of power supply (e.g., only ten percent of a battery life remains). If "Yes" at decision 804, then the process proceeds to 806 where a main processor is interrupted (e.g., woken up) to process the data units stored in the dedicated memory. If "No" at decision 804, then the process returns to 802 and continues to monitor the power supply of the wireless device.

EXAMPLE CLAUSES

Example A, a method comprising: receiving one or more data units; determining, by a wireless device, that the one or more data units have been transferred using low-power consumption transfer; in response to determining that the one or more data units have been transferred using the low-power consumption data transfer, directly storing the one or more data units in a predetermined memory of the wireless device; determining that a condition exists to interrupt a main processor of the wireless device to process the one or more data units directly stored in the predetermined memory of the wireless device; and interrupting, based at least in part on the determining, the main processor of the wireless device to process the one or more data units directly stored in the predetermined memory of the wireless device.

Example B, the method of Example A, wherein the predetermined memory is a dedicated memory and access to the dedicated memory of the wireless device by a network interface is enabled for direct storage of the one or more data units without involving a main processor.

Example C, the method of Example A or Example B, further comprising determining that the one or more data units were transferred in accordance with a particular connection characteristic, and wherein the determining that the one or more data units have been transferred using the low-power consumption transfer is based at least in part on the particular connection characteristic.

Example D, the method of Example C, further comprising communicating, from the wireless device to a partner device from which the one or more data units are received, an indication of the particular connection characteristic so that the partner device is enabled to configure the one or more data units to be transferred using the low-power consumption transfer.

Example E, the method of Example C or Example D, wherein the particular connection characteristic comprises a particular network port.

Example F, the method of Example C or Example D, wherein the particular connection characteristic comprises a specific data transfer protocol.

Example G, the method of any one of Example A through Example F, further comprising determining, as at least part of the condition, that a number of unprocessed data units stored in the predetermined memory exceeds a threshold number of unprocessed data units.

Example H, the method of any one of Example A through Example F, further comprising determining, as at least part of the condition, that a total amount of unprocessed data stored in the predetermined memory exceeds a threshold total amount of unprocessed data.

Example I, the method of any one of Example A through Example F, further comprising determining, as at least part of the condition, that an available amount of storage space of the predetermined memory is below a threshold amount of storage space.

Example J, the method of any one of Example A through Example F, further comprising determining, as at least part of the condition, that an available amount of remaining power of a power supply of the wireless device is below a threshold amount of power.

While Example A through Example J are described above with respect to a method, it is understood in the context of this document that the content of Example A through Example J may also be implemented in association with a device and/or computer storage media.

Example K, a wireless device comprising: a wireless network interface; one or more processors; and one or more memories storing instructions that, when executed on the one or more processors, cause the wireless network interface to: provide, to another device in communication with the wireless device, an instruction to store data in one or more specific storage locations of a memory of the other device; retrieve the data from the specific storage location of the memory of the other device; and directly store the data in a dedicated memory of the wireless device without interrupting a main processor of the wireless device.

Example L, the wireless device of Example K, wherein the instructions further cause the wireless network interface to: determine that a condition exists to interrupt the main processor of the wireless device to process the data; and interrupt the main processor of the wireless device to process the data.

Example M, the wireless device of Example L, wherein the instructions further cause the wireless network interface to determine, as at least part of the condition, that an available amount of storage space of the dedicated memory is below a threshold amount of storage space.

Example N, the wireless device of Example L, wherein the instructions further cause the wireless network interface to determine, as at least part of the condition, that an available amount of remaining power of a power supply of the wireless device is below a threshold amount of power.

While Example K through Example N are described above with respect to a wireless device, it is understood in the context of this document that the content of Example K through Example N may also be implemented in association with a method and/or computer storage media.

Example O, one or more computer storage media storing computer executable instructions that, when executed, cause a device to perform operations comprising: receiving data transfer settings from another device; collecting values from one or more sensors based at least in part on the data transfer settings received from the other device, wherein the data transfer settings instruct the device to transfer at least a portion of the values from the device to the other device via low-power consumption data transfer; and configuring, based at least in part on the data transfer settings, the at least the portion of the values for transfer to the other device via the low-power consumption data transfer.

Example P, the one or more computer storage media of Example O, wherein the configuring comprises generating one or more data units to be transferred in accordance with a particular connection characteristic assigned to the low-power consumption data transfer.

Example Q, the one or more computer storage media of Example O, wherein the configuring comprises storing the at least the portion of the values in one or more specific storage locations of a memory of the device enabling direct memory access to the at least the portion of the values from the one or more specific storage locations.

Example R, the one or more computer storage media of any one of Example O through Example Q, wherein the data transfer settings define that a particular type of data is to be collected and transferred via the low-power consumption data transfer, wherein the at least the portion of values is associated with the particular type of data.

Example S, the one or more computer storage media of Example R, wherein the operations further comprise: detecting a trigger to switch transfer of the particular type of data from the low-power consumption data transfer to a regular data transfer that immediately interrupts a main processor of the other device; and transferring, based at least in part on the trigger, additional values of the particular type of data via the regular data transfer.

Example T, the one or more computer storage media of Example S, wherein the trigger comprises a detected value of the particular type of data exceeding a threshold value.

While Example O through Example T are described above with respect to one or more computer storage media, it is understood in the context of this document that the content of Example O through Example T may also be implemented in association with a device and/or a method.

CONCLUSION

Although the subject matter has been described in language specific to structural features and/or methodological acts, it is to be understood that the subject matter defined in the claims is not necessarily limited to the specific features or acts described above. Rather, the specific features and acts described above are described as example forms of implementing the claims.

What is claimed is:

1. A method comprising:

communicating, from a wireless device to a partner device, an indication of a first connection characteristic so that the partner device is enabled to configure one or more data units to be transferred using low-power consumption transfer, the first connection characteristic being one of a plurality of different connection characteristics;

assigning the first connection characteristic to the low-power consumption transfer;

receiving, over a period of time, the one or more data units via the first connection characteristic, an individual data unit comprising one or more values detected by the partner device;

determining, by the wireless device, that the one or more data units have been transferred using the low-power consumption transfer based on the receiving the one or more data units via the first connection characteristic;

in response to determining that the one or more data units have been transferred using the low-power consumption data transfer, directly storing the one or more data units in a predetermined memory of the wireless device without interrupting a main processor of the wireless device;

receiving a subsequent data unit via a second connection characteristic of the plurality of different connection characteristics, the second connection characteristic being different than the first connection characteristic and the second connection characteristic being associated with regular-power consumption transfer, wherein the subsequent data unit includes an individual value, detected by the partner device, that exceeds a threshold value; and interrupting, based at least in part on the receiving the subsequent data unit via the second connection characteristic, the main processor of the wireless device to process the one or more data units directly stored in the predetermined memory of the wireless device.

2. The method of claim 1, wherein the predetermined memory is a dedicated memory and access to the dedicated memory of the wireless device by a network interface is enabled for direct storage of the one or more data units without involving the main processor.

3. The method of claim 1, further comprising determining that the one or more data units were transferred via the first connection characteristic based at least in part on a flag in an individual data unit that identifies the first connection characteristic.

4. The method of claim 1, wherein the first connection characteristic comprises a particular network port.

5. The method of claim 1, wherein the first connection characteristic comprises a specific data transfer protocol.

6. The method of claim 1, wherein the wireless device and the partner device agree to assign the first connection characteristic to the low-power consumption transfer prior to transfer of the one or more data units.

7. The method of claim 1, wherein the first connection characteristic and the second connection characteristics comprise different network ports.

8. The method of claim 1, wherein the first connection characteristic and the second connection characteristics comprise different data transfer protocols.

9. A wireless device comprising:

one or more processors; and one or more memories storing instructions that, when executed on the one or more processors, cause the wireless device to:

receive data transfer settings from another device, wherein the data transfer settings define that a particular type of data is to be collected and transferred via a low-power consumption data transfer that uses a first connection characteristic of a plurality of different connection characteristics;

collect values of the particular type of data from one or more sensors based at least in part on the data transfer settings received from the other device, wherein the data transfer settings instruct the wireless device to transfer at least one or more of the values from the wireless device to the other device via the low-power consumption data transfer;

transfer, based at least in part on the data transfer settings, the one or more of the values to the other device via the low-power consumption data transfer;

detect a trigger to switch transfer of the particular type of data from the low-power consumption data transfer to a regular-power consumption data transfer that uses a second connection characteristic, of the plurality of different connection characteristics, that is different than the first connection characteristic, wherein the second connection characteristic causes immediate interruption of a main processor of the other device; and transfer, based at least in part on the trigger, additional values of the particular type of data via the regular-power consumption data transfer.

10. The wireless device of claim 9, wherein the trigger comprises a detected value of the particular type of data exceeding a threshold value.

11. The wireless device of claim 9, wherein the wireless device and the other device agree to assign the first connection characteristic to the low-power consumption transfer prior to transferring the one or more values.

12. The wireless device of claim 9, wherein the first connection characteristic and the second connection characteristics comprise different network ports.

13. The wireless device of claim 9, wherein the first connection characteristic and the second connection characteristics comprise different data transfer protocols.

14. One or more non-transitory computer storage media storing computer executable instructions that, when executed, cause a device to perform operations comprising:

receiving data transfer settings from another device, wherein the data transfer settings define that a particular type of data is to be collected and transferred via a low-power consumption data transfer that uses a first connection characteristic of a plurality of different connection characteristics;

collecting values of the particular type of data from one or more sensors based at least in part on the data transfer;

settings received from the other device, wherein the data transfer settings instruct the device to transfer at least one or more of the values from the device to the other device via the low-power consumption data transfer;

transferring, based at least in part on the data transfer settings, the one or more of the values for transfer to the other device via the low-power consumption data transfer;

detecting a trigger to switch transfer of the particular type of data from the low-power consumption data transfer to a regular-power consumption data transfer that uses a second connection characteristic, of the plurality of different connection characteristics, that is different than the first connection characteristic, wherein the second connection characteristic causes immediate interruption of a main processor of the other device; and transferring, based at least in part on the trigger, additional values of the particular type of data via the regular-power consumption data transfer.

15. The one or more non-transitory computer storage media of claim 14, wherein the operations further comprise storing the one or more of the values in one or more specific storage locations of a memory of the device enabling direct memory access to the one or more of the values from the one or more specific storage locations.

16. The one or more non-transitory computer storage media of claim 14, wherein the trigger comprises a detected value of the particular type of data exceeding a threshold value.

17. The one or more non-transitory computer storage media of claim 14, wherein the device and the other device agree to assign the first connection characteristic to the low-power consumption transfer prior to transferring the one or more values.

18. The one or more non-transitory computer storage media of claim 14, wherein the first connection characteristic and the second connection characteristics comprise different network ports.

19. The one or more non-transitory computer storage media of claim 14, wherein the first connection characteristic and the second connection characteristics comprise different data transfer protocols.

* * * * *